United States Patent
Nemeth et al.

(10) Patent No.: US 7,866,156 B2
(45) Date of Patent: Jan. 11, 2011

(54) DEVICE AND METHOD FOR SUPPLYING FRESH AIR TO A TURBOCHARGED RECIPROCATING-PISTON INTERNAL COMBUSTION ENGINE

(75) Inventors: Huba Nemeth, Budapest (HU); Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 126 days.

(21) Appl. No.: 12/388,890

(22) Filed: Feb. 19, 2009

(65) Prior Publication Data

US 2009/0235663 A1   Sep. 24, 2009

Related U.S. Application Data

(63) Continuation of application No. PCT/EP2007/007358, filed on Aug. 21, 2007.

(30) Foreign Application Priority Data

Aug. 22, 2006   (DE) .................. 10 2006 039 300

(51) Int. Cl.
*F02B 33/44*   (2006.01)
*F02B 21/00*   (2006.01)
*F02B 37/00*   (2006.01)
*F02M 25/07*   (2006.01)

(52) U.S. Cl. .............. 60/605.1; 60/605.2; 123/571; 123/568.21; 701/108

(58) Field of Classification Search ............ 60/605.1, 60/605.2; 123/571, 568.21; 701/108; F02B 21/00, F02B 33/34, 37/00

See application file for complete search history.

(56) References Cited

U.S. PATENT DOCUMENTS

| 4,615,172 | A |   | 10/1986 | Mayer ..................... 60/602 |
| 4,624,228 | A |   | 11/1986 | Sahara et al. ............ 123/569 |
| 5,738,126 | A | * | 4/1998 | Fausten ................ 123/568.21 |
| 5,918,582 | A | * | 7/1999 | Itoyama et al. ........ 123/568.29 |
| 6,230,697 | B1 | * | 5/2001 | Itoyama et al. ........ 123/568.21 |
| 6,295,817 | B1 |   | 10/2001 | Abthoff et al. ............. 60/612 |

(Continued)

FOREIGN PATENT DOCUMENTS

DE   3840970 A1  *  6/1990

(Continued)

OTHER PUBLICATIONS

International Search Report dated Nov. 30, 2007 w/English translation (four (4) pages).

*Primary Examiner*—Thai Ba Trieu
(74) *Attorney, Agent, or Firm*—Crowell & Moring LLP

(57) ABSTRACT

A device for fresh-gas supply for a turbocharged, compression-ignition, reciprocating-piston internal-combustion engine is provided. The engine has fresh-gas supply pipe and exhaust gas manifold pipe, between which an EGR device is installed. A tubular inside space section of the fresh-gas supply pipe located downstream of a turbocharger has a compressed-air connection with a volume control device, and a butterfly valve for controlling throughflow. Operation of the butterfly valve is controlled by an electronic control unit of the engine which processes sensor signals. A control valve of the EGR device, which is electronically controlled and controls the exhaust gas throughflow volume, is connected to the electronic control unit for synchronized operation of the butterfly valve with the volume control device.

14 Claims, 3 Drawing Sheets

U.S. PATENT DOCUMENTS

| | | | |
|---|---|---|---|
| 6,763,799 B2 * | 7/2004 | Ito et al. | 123/568.21 |
| 6,966,303 B2 * | 11/2005 | Harunari et al. | 123/568.21 |
| 2008/0051943 A1 * | 2/2008 | Higuchi | 700/281 |
| 2009/0038308 A1 * | 2/2009 | Nagae | 60/602 |
| 2009/0288393 A1 * | 11/2009 | Matsuno et al. | 60/286 |
| 2010/0174471 A1 * | 7/2010 | Nakayama | 701/108 |

FOREIGN PATENT DOCUMENTS

| | | |
|---|---|---|
| DE | 19837094 C1 * | 2/2000 |
| DE | 198 40 629 A1 | 3/2000 |
| DE | 19902052 A1 * | 7/2000 |
| DE | 199 13 157 A1 | 10/2000 |
| DE | 19944946 A1 * | 7/2001 |
| DE | 10 2004 055 574 A1 | 5/2006 |
| EP | 0 152 870 A2 | 8/1985 |
| FR | 2831605 A1 * | 5/2003 |
| WO | WO 9323660 A1 * | 11/1993 |
| WO | WO 2005/064134 A1 | 7/2005 |
| WO | WO 2006037564 A1 * | 4/2006 |
| WO | WO 2007060274 A1 * | 5/2007 |

* cited by examiner

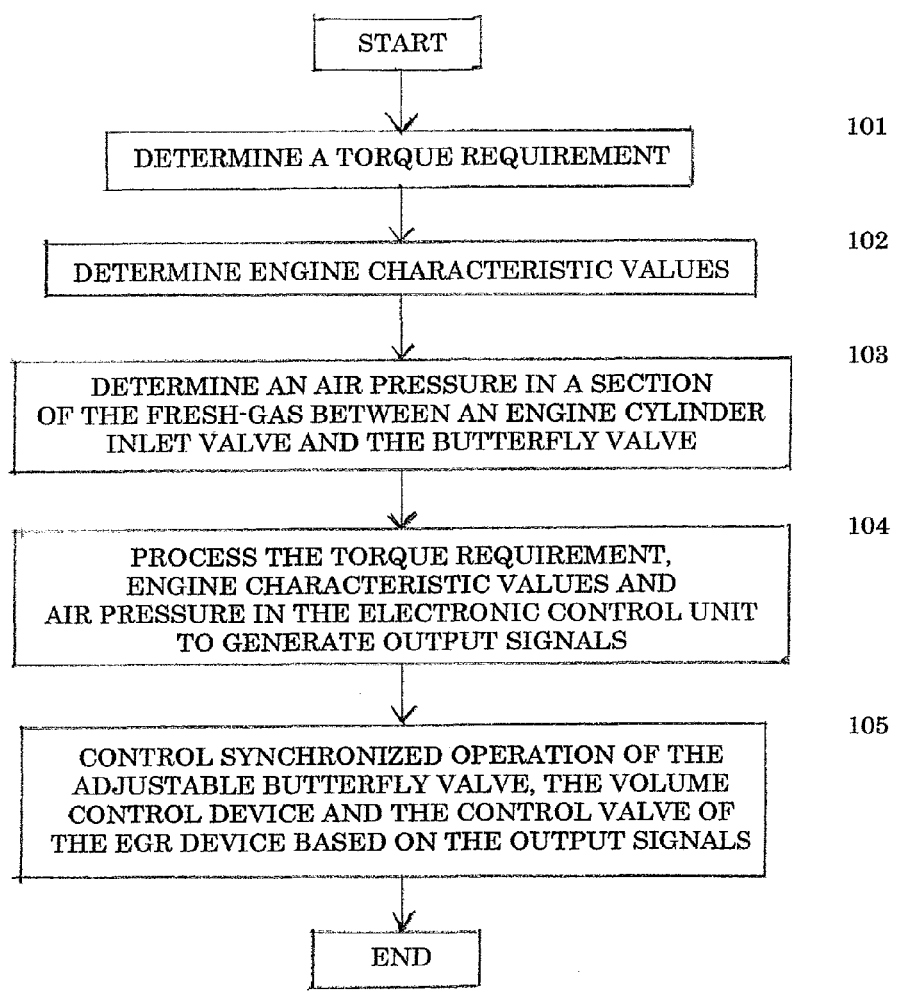

DEVICE AND METHOD FOR SUPPLYING FRESH AIR TO A TURBOCHARGED RECIPROCATING-PISTON INTERNAL COMBUSTION ENGINE

CROSS-REFERENCE TO RELATED APPLICATIONS

This application is a U.S. continuation of International Application No. PCT/EP2007/007358, filed Aug. 21, 2007, and claims priority under 35 U.S.C. §119 to German Patent Application No. 10 2006 039 300.7, filed Aug. 22, 2006, the entire disclosures of which are expressly incorporated by reference herein.

BACKGROUND AND SUMMARY OF THE INVENTION

The invention relates to a device and a method for fresh-air supply of a turbocharged, reciprocating-piston internal combustion engine.

The fresh-air supply devices of the type which are the subject of the invention are used for boosting exhaust gas turbochargers. Particularly in the low speed range of a turbocharged, compression-ignition, reciprocating-piston internal-combustion engine, the connected exhaust gas turbocharger, for want of adequate drive energy, in most cases cannot develop the necessary charging pressure. These circumstances are brought to the attention of the driver when accelerating from a low speed, which is known as the so-called turbo lag effect. For compensation of this turbo lag effect, additional compressed air from a compressed air supply of the motor vehicle is fed into the intake pipe of the reciprocating-piston internal-combustion engine in the requirement situation. Many motor vehicle types, such as commercial vehicles or omnibuses, in any case have a compressed air system available, from which inter alia the pneumatic brake system is supplied.

A generic-type fresh-air supply device for a turbocharged, reciprocating-piston internal-combustion engine follows from WO 2005/064134 A1. The charging air which is compressed by means of an exhaust gas turbocharger, reaches the cylinder chamber via an intake pipe in the same manner as an exhaust gas recirculation (EGR). Furthermore, a compressed air pipe leads into the side of the intake pipe and via a valve is opened or closed in an electronically controlled manner. In order to compensate the turbo lag effect, the valve is opened so that the external compressed air, which in this case is extracted from the compressed air accumulator of the compressed air system, reaches the intake chamber. In order to avoid backflowing of this additionally fed compressed air a force-actuated check valve is arranged in the intake pipe downstream of the turbocharger.

This check valve can be formed as a butterfly valve in the intake pipe. The force-actuation of a butterfly valve, which is arranged in the intake pipe, is resolved in a customary manner by an electronically-controlled electric motor. For diesel engines with an EGR device, it is proposed in U.S. Pat. No. 4,624,228 to arrange a butterfly valve in the intake pipe which during cold start of the diesel engine is operated in the closing direction, otherwise it is fully opened during normal operation.

It is an object of the present invention to create an efficient fresh-gas supply device for turbocharged, reciprocating-piston internal-combustion engines which are provided with an EGR device, and which is equipped with a compressed-air injection device and which can be universally used in turbocharged, compression-ignition, reciprocating-piston internal-combustion engines.

According to the invention, a butterfly valve is controlled in the fresh-gas supply device so that it is equally suitable as a control valve for the compressed-air injection device and for the EGR device, that is to say that the operation of the butterfly valve can fulfil the two control requirements of the reciprocating-piston internal-combustion engine. It is furthermore an advantage of the invention to improve the accelerating and emissions behavior of the turbocharged, reciprocating-piston internal-combustion engine by the common controlling/regulating of the compressed-air injection device and of the EGR device.

Other objects, advantages and novel features of the present invention will become apparent from the following detailed description when considered in conjunction with the accompanying drawings.

BRIEF DESCRIPTION OF THE DRAWINGS

FIG. 3 shows a flow chart of a method in accordance with an embodiment of the present invention.

DETAILED DESCRIPTION OF THE DRAWINGS

Figure 1:
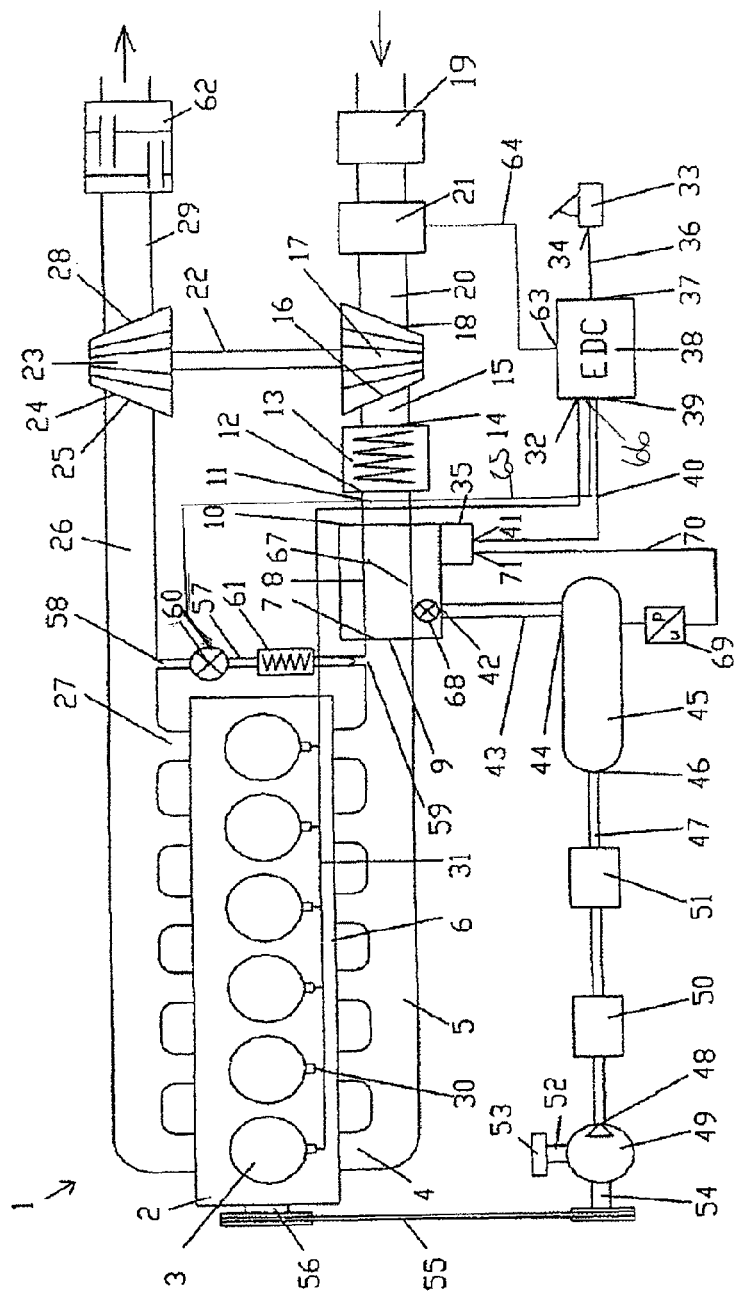
FIG. 1 shows a block diagram of a turbocharged, reciprocating-piston internal-combustion engine with a fresh-gas supply device and an EGR device in accordance with an embodiment of the present invention.

According to FIG. 1, an arrangement 1 comprises a turbocharged, reciprocating-piston internal-combustion engine 2 with six cylinders 3 in-line, the intake pipes 4 of which are connected to a fresh-gas supply pipe 5 which has a connecting flange 7 to which a fresh-gas pipe section module 8 is connected by its second end connection 9 for outflow. The first end connection 10 for inflow is connected by a pipe 11 to the outflow port 12 of the charging air cooler 13, the inflow port 14 of which is connected by a pipe 15 to the outflow port 16 of the turbocompressor 17. An air filter 19 is connected to the inflow port 18 of the turbocompressor 17 by the pipe 20 which includes a mass-flow sensor 21. The turbocompressor 17 forms a part of the exhaust gas turbocharger 22, the exhaust gas turbine 23 of which is connected by its inflow port 24 to the outflow port 25 of the exhaust-gas manifold pipe 26. The cylinders 3 are connected by exhaust pipes 27 to the exhaust gas manifold pipe 26. The outflow port 28 of the exhaust gas turbine 23 is connected to the exhaust-gas pipe 29.

The fuel supply of the cylinders 3 is carried out by means of the injection nozzles 30, the controlling of which is carried out by the lead 31 from the first terminal 32 of the central electronic control unit 38. The terminal 34 of an accelerator 33 is connected to the terminal 37 of the electronic control unit 38 by the lead 36. The accelerator 33 is provided with an operating component which is operated in a known per se manner by the driver of the motor vehicle. The mass flow sensor 21 is connected to the terminal 63 of the electronic control unit 38 by the electrical lead 64. The electrical terminal 39 of the electronic control unit 38 is connected to the electrical terminal 41 of the electronic control unit 35 of the fresh-gas pipe section module 8 by the bus line 40.

The fresh-gas pipe section module 8 has a compressed air connection 42 which is connected by the pipe 43 to the outlet connection 44 of the compressed-air reservoir 45. The feed connection 46 of the compressed-air reservoir 45 is connected by the pipe 47 to the compressed air connection 48 of the compressed air compressor 49. A pressure regulator 50 and air-drier 51 are installed in the pipe 47. The compressed air compressor 49 has an intake connector 52 which is provided with an air filter 53. The shaft 54 of the compressed air compressor 49 is connected by a belt drive 55 to the main shaft 56 of the turbocharged diesel engine of the motor vehicle. The compressed-air reservoir 45 is provided with a pressure sensor 69 which is connected by the electrical lead 70 to the terminal 71 of the electronic control unit 35.

The arrangement 1 is furthermore provided with an EGR device 57 which is connected by its exhaust gas connection 58 to the exhaust gas manifold pipe 26, and by its exhaust gas outlet connection 59 to the fresh-gas supply pipe 5 which introduces the fresh gas into the cylinders 3. The EGR device 57 includes a control valve 60 and a heat exchanger 61 for cooling the throughflowing exhaust gas. The heat exchanger 61 utilizes the cooling water of the engine radiator as cooling medium, the connections of which are not shown. For satisfying high demands with regard to emissions, a catalyst/particle filter 62, which is connected in series to a damping filter and a silencer, is arranged in the exhaust-gas pipe 29 downstream of the exhaust-gas turbine 23. The control valve 60 is connected by an electrical lead 65 to the terminal 66 of the electronic control unit 38 which controls the control valve 60, and furthermore two represented elements of the fresh-gas pipe section module 8, specifically a butterfly valve 67 and a volume control device 68, are controlled by an electrical bus line 40 from the electronic control unit 38. By means of the butterfly valve 67, the inflow chamber 91 and outflow chamber 92 of the fresh-gas pipe section module 8 are separated and the fresh-gas flow cross section is controlled, and the compressed air flow through the pipe 43 is controlled by means of the volume control device 68.

Figure 2:
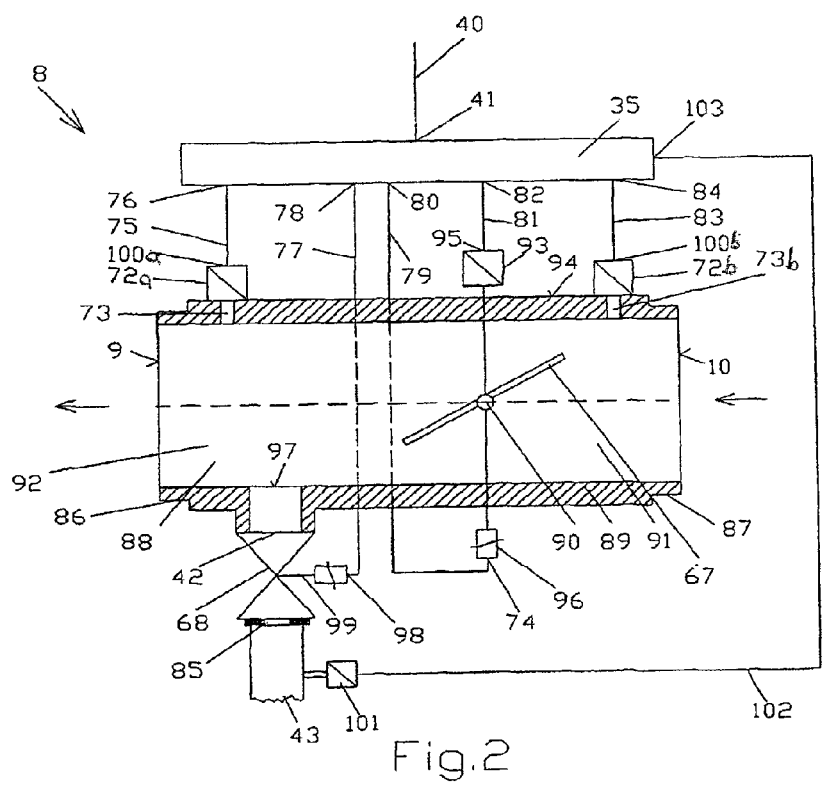
FIG. 2 shows a block diagram of the fresh-gas pipe section of the fresh-gas supply device of FIG. 1, which is formed as a module, in detail.

In FIG. 2, the module 8 as such, which is formed in a tubular manner, is shown in detail, and has the first end connection 10 and also the second end connection 9, between which there is an inside space section 88 which has a circular cross section. The inside space section 88 is expediently enclosed by the wall 89 in which the shaft 90 of the butterfly valve 67 is mounted and guided through. The butterfly valve 67 divides the inside space section 88 into two sections, specifically the inflow chamber 91, which exists between the first end connection 10 and the butterfly valve 67, and also the outflow chamber 92, which exists between the second end connection 9 and the butterfly valve 67.

The butterfly valve 67 has a closed and a completely opened end position, and also optional intermediate positions which can be adjusted by rotating the shaft 90. The adjusting device 96 which is provided for this is formed in this exemplary embodiment as an electric motor and is equipped with an electric adjusting device terminal 74 which is connected by a lead 79 to the first terminal 80 of the electronic control unit 35. By the adjusting device terminal 74, the adjusting device 96 is supplied with current; a signal concerning the position of the butterfly valve 67 is taken from the terminal 95 of the position detection sensor 93; the terminal 95 in its turn is connected by a lead 81 to the terminal 82 of the electronic control unit 35 of the module 8.

In the wall 89, a compressed air inlet port 97 is furthermore formed between the second end connection 9 and the butterfly valve 67, and to which is connected the compressed air connection 42 which is equipped with a volume control device 68. The volume control device 68 also has a fully blocked position. The electric control terminal 98 of the volume control device 68, which has a valve 99, is connected to the terminal 78 of the electronic control unit 35 of the module 8 by the lead 77.

The terminal 76 of the pressure sensor 72a, which is fastened on the wall 89, is connected by lead 75 to the terminal 76 of the electronic control unit 35; the pressure gauge 73 of the pressure sensor 72a by its output 100a is plugged into the outflow chamber 92 of the fresh-gas pipe section module 8. A similar terminal 84 of the pressure transducer 72b, which is fastened on the wall 89, is connected via the output 100b by lead 83 to the terminal 84 of the electronic control unit 35. The pressure gauge 73b of the pressure transducer 72b is plugged into the inflow chamber 91 of the module 8.

The electronic control unit 35 of the module 8 is provided with a central terminal 41 to which the central bus line 40 is connected. The bus line 40 is formed as a communication line, which is connected to the engine electronics, which are not shown, which comprise a central control unit (ECU) which is provided with corresponding software.

At the two ends, the fresh-gas pipe section module 8 is provided with pipe connections 86 and 87 which are suitable for installation with sealing effect into the pipe 11 through which the fresh-gas supply of the turbocharged diesel engine is achieved. The pipe connections 86 and 87 are formed so that they are suitable for the fastening of the fresh-gas pipe section module 8.

The volume control device 68 has an exchangeable restrictor 85 in the inflow port, by which the throughflow volume is limited or is modularly adapted to the engine size. The device is preferably designed so that the output of the pressure sensor 69 is connected to the electronic control unit 35 of the fresh-gas pipe section module 8, which pressure sensor 69 is for measuring the pressure in the compressed-air reservoir 45.

The device with fresh-gas pipe section module 8 is preferably designed so that the output of the pressure sensor 101 is connected by an electrical lead 102 to the terminal 103 of the electronic control unit 35 of the fresh-gas pipe section module 8, which pressure sensor 101 is provided for measuring the pressure in the pipe 43 in the proximity of the volume control device 68.

The valve unit 60 of the EGR device, which valve unit is electronically controlled and controls the exhaust gas throughflow volume, is connected to the electronic control unit 38 of the reciprocating-piston internal-combustion engine which has an ECU which is equipped with software for the synchronized operation of the butterfly valve 67 and of the volume control device 68 and of the valve unit 60 of the EGR device 57.

The function of the arrangement 1 puts into effect the method of the invention for improving the accelerating and emissions behavior of a vehicle's reciprocating-piston internal-combustion engine 2 in diesel configuration with turbocharging and EGR device 57, wherein the device is provided with a compressed air accumulator 45 into which compressed air is injected for the occasional injection in a controlled manner into the fresh-gas pipe section 8 of the fresh-gas supply pipe 5. A control element, in the form of the butterfly valve 67 for controlling the EGR device 57 and the compressed-air injection device, is arranged in the fresh-gas pipe section 8. The following method steps, as illustrated in FIG. 3, are carried out:

determining the torque requirement signal and feeding the data to the electronic control unit 38 (step 101), determining the engine characteristic values and feeding the characteristic values to the electronic control unit 38 (step 102), determining the air pressure in the inside space of the fresh-gas pipe section module 8 between cylinder inlet valve and butterfly valve 67, and feeding the pressure value to the electronic control unit 38 (step 103), processing aforementioned supplied data in the electronic control unit for creating operating output signals (step 104) for a synchronized operation of the butterfly valve with the volume control device and the control valve of the EGR device (step 105).

The method is preferably carried out so that in the electronic control units 35 or 38 the output signals are determined by computer technique by software from the input signals.

The method is preferably carried out so that in the electronic control unit 38, for creating operating output signals for operating the butterfly valve 67 in the case of a simultaneous response of the EGR device 57 and of the compressed-air injection, the response of the compressed-air injection is always given priority.

The output of the pressure sensor 69 is connected to the electronic control unit of the fresh-gas pipe section module, which pressure sensor 69 is provided for measuring the pressure in the compressed-air reservoir 45.

The signal of the pressure sensor 69, which is provided for measuring the pressure in the compressed-air reservoir 45, is continuously transmitted to, and processed in, the electronic control unit 35 during injecting, as a result of which the mass flow of injected compressed air to the volume control device 68 is continuously determined and its result is made available to the electronic control unit 38 of the reciprocating-piston internal-combustion engine 2 as an input signal.

The signal of the pressure sensor 101, which is provided for measuring the pressure in the injection-air pipe 43, is transmitted to the electronic control unit 35 before injecting, as a result of which the mass flow of injected compressed air to the volume control device 68 is continuously determined and its result is made available to the electronic control unit 38 of the reciprocating-piston internal-combustion engine 2 as an input signal.

The signal of mass flow together with the volume of the compressed-air reservoir 45 during injecting is used for determining by computer the pressure of the compressed-air reservoir 45.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving behaviours of accelerating and emissions of a reciprocating-piston internal-combustion engine of compression-ignition configuration with turbo charging, an EGR device, and compressed air injection supplied from a compressed-air accumulator into a fresh-gas pipe section module of a fresh-gas supply pipe, the engine being provided with an adjustable butterfly valve for use in conjunction with the EGR device and the compressed-air injection to control gas injection into the engine, comprising:

determining a torque requirement;
   determining engine characteristic values;
   determining an air pressure in a section of the fresh-gas pipe between an engine cylinder inlet valve and the butterfly valve;
   processing the torque requirement, engine characteristic values and air pressure in an electronic control unit to generate output signals for control of the adjustable butterfly valve, a volume control device which controls the compressed air throughflow from the compressed-air accumulator and a control valve which controls an exhaust gas throughflow through the EGR device; and
   controlling synchronized operation of the adjustable butterfly valve, the volume control device and the control valve of the EGR device based on the output signals from the electronic control unit.

2. The method as claimed in claim 1, wherein
in the processing step, a response of the compressed-air injection is given priority by the electronic control unit over the adjustable butterfly valve and the EGR device.

3. The method as claimed in claim 1, wherein
in the processing step, a response of the compressed-air injection is given priority by the electronic control unit generating output signals for operation of the adjustable butterfly valve in the closing direction.

4. The method as claimed in claim 1, wherein
a pressure sensor for sensing a pressure in a compressed-air reservoir configured to supply compressed air to the compressed-air connection is connected to the electric control unit.

5. The method as claimed in claim 4, further comprising:
continuously transmitting a signal of the pressure sensor measuring the pressure in the compressed-air reservoir during injection as an input signal to the electronic control unit.

6. The method as claimed in claim 5, further comprising:
continuously transmitting a signal of a pressure sensor which measures a pressure in an injection-air pipe which conducts compressed air from the compressed-air accumulator to the fresh-gas pipe section module of the fresh-gas supply pipe to the electronic control unit before injection.

7. The method as claimed in claim 6, wherein
determining a pressure of the compressed-air reservoir by the electronic control unit based on a compressed air mass flow derived from the signal of the pressure sensor and a volumetric value of the compressed-air reservoir during injecting.

8. A computer executable program stored in a non-transitory computer-readable storage medium for operating a device for fresh-gas supply for a turbocharged, compression-ignition, reciprocating-piston internal-combustion engine having a fresh-gas supply pipe, an exhaust gas manifold pipe and an EGR device is installed between the fresh-gas supply pipe and the exhaust gas manifold pipe, the device including a housing through which a portion of the fresh-gas supply pipe passes,
   a compressed air connection communicating with an inside space of the portion of the fresh-gas supply pipe within the housing, the compressed-air connection being provided with a volume control device,
   an adjustable butterfly valve for controlling throughflow through the fresh-gas supply pipe arranged within the inside space, and
   an electronic control unit
   wherein
      the portion of the fresh-gas supply pipe has a first end connection which receives an inflow of charging air from an exhaust gas turbocharger and a second end connection from which the charging air is discharged,
      the adjustable butterfly valve is arranged between the compressed-air connection and the first end connection and is connected to an adjusting device arranged to be controlled by the electronic control unit of the reciprocating-piston internal-combustion engine which processes sensor signals, and a control valve of the EGR device, which is arranged to be controlled by the electronic control unit of the reciprocating-piston internal-combustion engine to control an exhaust gas throughflow volume in synchronized operation with the adjustable butterfly valve, the device being operated in accordance with the program when executing to perform the acts of:

determining a torque requirement;

determining engine characteristic values;

determining an air pressure in a section of the fresh-gas pipe between an engine cylinder inlet valve and the butterfly valve;

processing the torque requirement, engine characteristic values and air pressure in the electronic control unit to generate output signals for control of the adjustable butterfly valve, the volume control device and the control valve of the EGR device; and controlling synchronized operation of the adjustable butterfly valve, the volume control device and the control valve of the EGR device based on the output signals from the electronic control unit.

9. A device for fresh-gas supply for a turbocharged, compression-ignition, reciprocating-piston internal-combustion engine having a fresh-gas supply pipe, an exhaust gas manifold pipe and an EGR device installed between the fresh-gas supply pipe and the exhaust gas manifold pipe, comprising:

a housing through which a portion of the fresh-gas supply pipe passes;

a compressed air connection communicating with an inside space of the portion of the fresh-gas supply pipe within the housing, the compressed-air connection being provided with a volume control device; and an adjustable butterfly valve for controlling throughflow through the fresh-gas supply pipe arranged within the inside space, wherein the portion of the fresh-gas supply pipe has a first end connection which receives an inflow of charging air from an exhaust gas turbocharger and a second end connection from which the charging air is discharged, the adjustable butterfly valve is arranged between the compressed-air connection and the first end connection and is connected to an adjusting device arranged to be controlled by an electronic control unit of the reciprocating-piston internal-combustion engine which processes sensor signals, and a control valve of the EGR device, which is arranged to be controlled by the electronic control unit of the reciprocating-piston internal-combustion engine to control an exhaust gas throughflow volume in synchronized operation with the adjustable butterfly valve and the volume control device.

10. The device as claimed in claim 1, further comprising:

a sensor for sensing a position of the adjustable butterfly valve;

a sensor for sensing a position of the control valve of the EGR device; and a sensor for sensing a position of the volume control device, wherein each of the sensors is arranged to be connected to the electronic control unit of the reciprocating-piston internal-combustion engine.

11. The device as claimed in claim 9, further comprising:

at least one pressure sensor arranged to be installed in the fresh-gas supply pipe at least one of upstream and downstream of the adjustable butterfly valve, wherein the at least one pressure sensor is arranged to be connected to the electronic control unit.

12. The device as claimed in claim 9, wherein the housing containing the adjustable butterfly valve is a fresh-gas pipe section module of the fresh-gas supply pipe which includes at least one pressure sensor upstream of the adjustable butterfly valve and at least one pressure sensor downstream of the adjustable butterfly valve and the compressed-air connection, and an exhaust gas outlet connection which receives exhaust gas from the EGR device is arranged in the fresh-gas supply pipe between cylinders of the reciprocating-piston internal-combustion engine and the fresh-gas pipe section module.

13. The device as claimed in claim 9, wherein a pressure sensor for sensing a pressure in a compressed-air reservoir operable to supply compressed air to the compressed-air connection is arranged to be connected to the electric control unit.

14. The device as claimed in claim 1, wherein a pressure sensor for sensing a pressure in a pipe near the volume control device is arranged to be connected to the electric control unit.

* * * * *